United States Patent [19]

Carlson

[11] 4,072,195
[45] Feb. 7, 1978

[54] HOE ATTACHMENT FOR EDGERS

[75] Inventor: Elmer Carl Carlson, Pearland, Tex.

[73] Assignee: T & H Mfg. Co., Inc., Pearland, Tex.

[21] Appl. No.: 709,403

[22] Filed: July 28, 1976

[51] Int. Cl.² .............................................. A01B 45/00
[52] U.S. Cl. ...................................... 172/15; 172/123;
  56/256; 56/295
[58] Field of Search ....................... 172/13, 14, 15, 16,
  172/42, 54 D, 118, 121, 123; 56/256, 295; 37/94

[56] References Cited
U.S. PATENT DOCUMENTS

| | | | |
|---|---|---|---|
| 2,708,819 | 5/1955 | Britten | 56/295 |
| 2,721,438 | 10/1955 | O'Maley | 56/295 |
| 3,003,298 | 10/1961 | Wininger | 56/295 X |
| 3,192,693 | 7/1965 | Bergeson | 172/13 X |
| 3,319,365 | 5/1967 | Perry | 172/15 |
| 3,445,992 | 5/1969 | Hanson | 56/295 |
| 3,530,653 | 9/1970 | Ott | 56/256 |
| 3,656,554 | 4/1972 | Buhner | 172/540 |
| 3,681,903 | 8/1972 | Phillips | 56/295 |
| 3,780,509 | 12/1973 | Woelffer | 56/295 |

Primary Examiner—Richard J. Johnson
Attorney, Agent, or Firm—Arthur M. Dula; Ned L. Conley; Russell D. Weaver

[57] ABSTRACT

An edger blade uniquely designed to cut into the surface of the ground thus loosening a portion of the dirt, lifting the loosened dirt from the ground, and throwing the dirt to one side. The blade is adaptable for mounting on most home garden edgers powered by internal combustion engines. The blade has a central hub portion provided with a shaft hole adapted to permit the blade to be mounted on the edger shaft. Two arms extend from opposite sides of the central hub portion to form hoe portions that perform the hoeing operations of the invention.

7 Claims, 8 Drawing Figures

HOE ATTACHMENT FOR EDGERS

BACKGROUND OF THE INVENTION

1. Field of the Invention

The present invention relates generally to home gardening tools and more particularly to a blade mounted on a shaft driven by a gas engine as part of a powered edger and adapted so the edger is useful as a power hoe.

2. Description of the Prior Art

The practice of gardening and yard care commonly requires breaking up the surface of the ground along the edges of flower beds and gardens either to trim the flower bed or garden or to remove weeds. In the prior art, home gardeners have used hand tools, such as hoes, for this purpose. Hoe have been manufactured in an assortment of configurations (see, e.g., U.S. Pat. Nos. 2,771,019 issued to Zeitz on Nov. 20, 1956; 2,383,388 issued to Hughes on Aug. 21, 1945; 2,291,144 issued to Brownsey on July 28, 1942; 2,201,436 issued to Jones on May 21, 1940; 1,901,778 issued to Schlag on Mar. 14, 1933; 1,688,971 issued to Kammerer on Oct. 23, 1928; 1,342,392 issued to Oleen on June 1, 1920; 1,210,100 issued to Pottorf on Dec. 26, 1916; and British Pat. No. 749,772 issued to Henderson on May 30, 1956). Such hoes are manually operated and include a cutting portion attached to a long handle. By forcing the cutting portion along the ground in one direction by means of the handle, the cutting portion breaks up the surface of the dirt.

Use of manually-operated garden tools, including hoes taught by the prior art, involves exhausting physical labor expended over a great amount of time. As a result, numerous labor-saving power tools have been developed.

One such power tool, the gasoline-engine powered edger, has gained rapid acceptance since its introduction on the market. The edger is used to trim lawns around the edges of sidewalks, curbs and gardens and includes a rapidly rotating flat blade that rotates about a horizontal shaft. The shaft, in turn, is connected to the engine by a belt and pully system. The entire operating unit is mounted on a mobile frame that is pushed by the operator by means of a handle extending above the rear of the frame. By aligning the plane in which the blade rotates over the portion of the lawn to be edged and then lowering the blade, the operator can trim the lawn simply by pushing the edger along the path to be edged.

Similar power tools have been developed to perform many of the operations involved in home gardening and yard care. The manually-operated hoe, however, remains as the only reasonably economical means for breaking up the surface of the ground along the edges of gardens and flower beds for trimming and removing weeds. One gasoline-powered tool, the power tiller, is commonly used for cultivating large areas of ground. The tiller, however, having a plurality of rotating tines that dig beneath the surface of the ground for the purpose of loosening the dirt is too large for use as a garden and flower bed trimmer and weeder. The cut of the tines is too deep and can damage the roots of the plants in the garden or flower bed. Also, the size of power tillers prohibits the use in small areas. Furthermore, the cost of an additional power-operated tool puts the tiller beyond the means of most home owners.

Thus, there has been a need for a device that would eliminate the exhaustive labor required in breaking up the surface of the soil along the edges of gardens and flower beds that does not require the purchase of an additional expensive power garden tool.

SUMMARY OF THE PRESENT INVENTION

The invention is a blade adaptable for mounting on the blade shaft of a gasoline-engine powered edger. The blade is uniquely designed to cut into the surface of the ground, scrape a portion of dirt loose from the ground, lift the dirt and throw it to one side. As the edger is pushed along the edge of a garden or flower bed, the blade trims and weeds the edge automatically.

The blade comprises a central hub portion with a shaft hole therethrough. The blade is mounted to the edger by means of the shaft hole. The blade has two arms connected to the hub portion opposite one another, each arm supporting a hoe portion that is contoured for optimum cutting, lifting and throwing action. The end portions are bent further to form tabs that assist in lifting and throwing dirt.

BRIEF DESCRIPTION OF THE DRAWINGS

For a detailed description of a preferred embodiment of the invention, reference will be made to the accompanying drawings wherein.

DESCRIPTION OF THE PREFERRED EMBODIMENT

Figure 1:
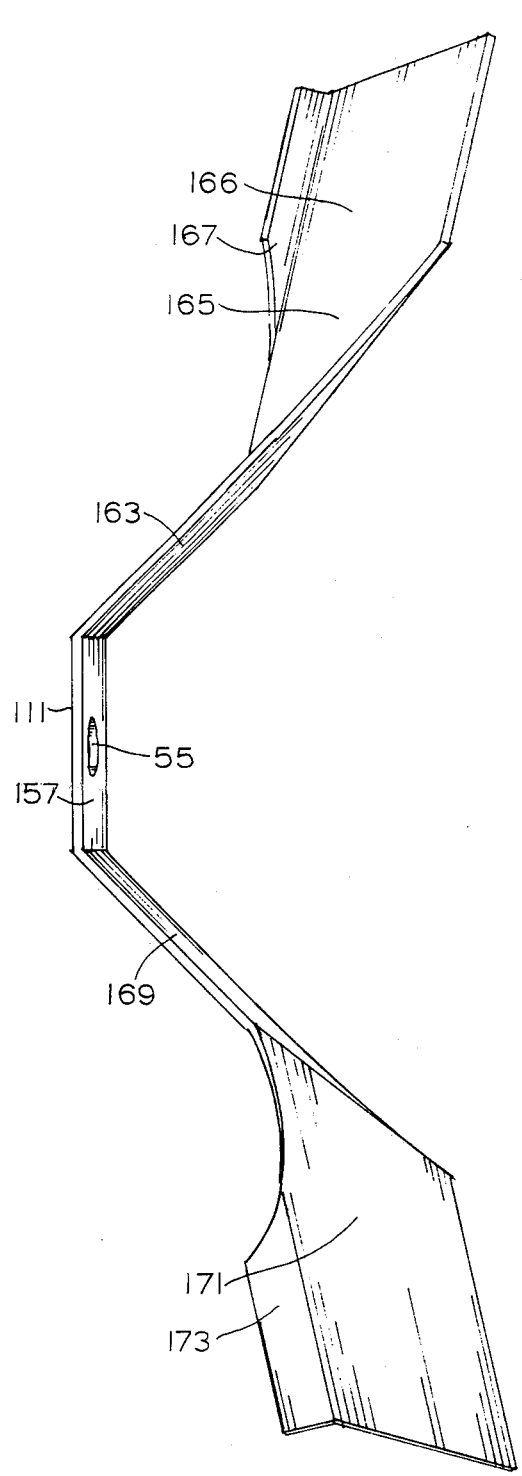
FIG. 1 is a side elevation of the preferred embodiment of the invention.
Figure 2:
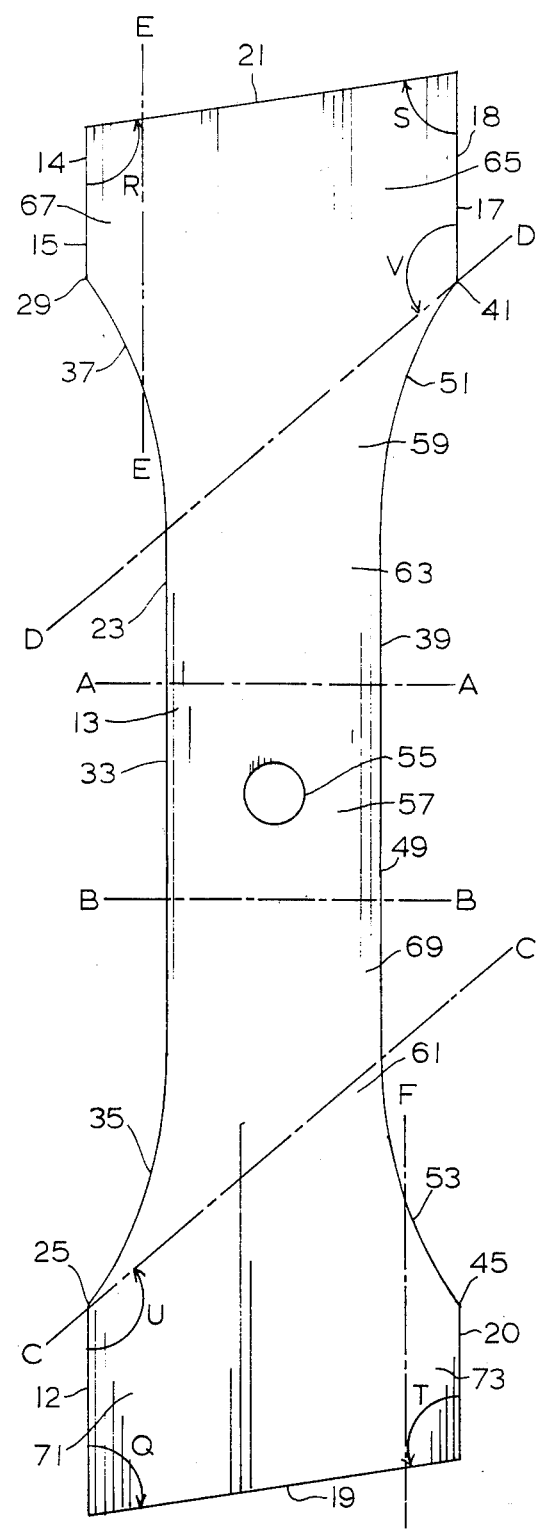
FIG. 2 is a plan view of the flat piece of steel from which the preferred embodiment of the invention is formed.

The preferred embodiment of the invention, shown as blade 111 in FIG. 1, is formed from flat, 11-gauge steel strip 13 shown in FIG. 2. Strip 13, having side edges 15 and 17 and end edges 19 and 21, has the general configuration of a parallelogram of base $9\frac{1}{4}$ inches, height $2\frac{1}{2}$ inches, and internal acute angle $81\frac{1}{2}°$.

Side edge 15 is divided into hoe edges 12 and 14 by recess 23. Recess 23 extends from point 25 which is $1\frac{3}{8}$ inch from internal acute angle Q formed by hoe edge 12 and end edge 19 to point 29 which is 1 inch from internal obtuse angle R formed by hoe edge 14 and end edge 21. Recess 23 has neck edge 33 extending parallel to side edge 15 and recessed 17/32 inch from side edge 15. Neck edge 33 is joined to side edge 15 by arcs 35 and 37 at points 25 and 29, respectively. Arcs 35 and 37 are tangent to neck edge 33.

Similarly, side edge 17 is divided into hoe edges 18 and 20 by recess 39. Recess 39 extends from point 41 which is $1\frac{3}{8}$ inch from internal acute angle S formed by hoe edge 18 and end edge 21 to point 45 which is 1 inch from internal obtuse angle T formed by hoe edge 20 and end edge 19. Recess 39 has neck edge 49 extending parallel to side edge 17 and recessed 17/32 inch from side edge 17. Neck edge 49 is joined to side edge 17 at points 41 and 45 by arcs 51 and 53, respectively. Arcs 51 and 53 are tangent to neck edge 49.

Shaft hole 55, having a diameter of ⅜ inch, extends through steel 13 at the geometrical center of the parallelogram generally formed by strip 13.

Blade 111 of FIG. 1 is formed from above-described strip 13 by bending steel 13 about 6 axes: axes A and B are perpendicular to side edges 15 and 17 and are 0.7 inch to either side of the geometrical center of the parallelogram generally formed by strip 13; axis C extends through point 25 and forms internal angle U of 130° with hoe edge 12; axis D extends through point 41 and forms internal angle V of 130° with hoe edge 18; axis E extends parallel to hoe edge 14 approximately ⅜ inch within hoe edge 14, and axis F extends parallel to hoe edge 20 approximately ⅜ inch within hoe edge 20.

The above-identified axes divide strip 13 into the following portions: hub portion 57 between axes A and B; first end portion 59 between end edge 21 and axis A; and second end portion 61 between end edge 19 and axis B. First end portion 59 is subdivided into first arm 63 between axes A and D, first hoe 65 between axes D and E, and first tab 67 between hoe edge 14 and axis E. Second end portion 61 is subdivided into second arm 69 between axes B and C, second hoe 71 between axes C and F, and second tab 73 between hoe edge 20 and axis F.

The direction of bending about the above identified axes will be described as follows: viewing strip 13 as in FIG. 2, "downward" is away from the viewer and "upward" is toward the viewer. Thus, first tab 67 is bent upward about axis E by an angle of 90°; tab 73 is bent upward about axis F by an angle of 90°; first hoe 65 is bent upward about axis D by an angle of 32°; second hoe 71 is bent upward about axis C by an angle of 32°; first portion 59 is bent downward about axis A by an angle of 45°; and second portion 61 is bent downward about axis B by an angle of 45°.

This bending forms strip 13 into the preferred embodiment of the invention shown in FIG. 1 as blade 111 having hub 157, first arm 163, second arm 169, hoe 165 with first hoe face 166, second hoe 171 with second hoe face (not shown), first tab 167, second tab 173, and shaft hole 55. This embodiment is designed for use with gasoline-powered edgers that have the blade on the left side of the edger when facing the edger from the rear. (see FIG. 4) Because such edgers are the more common, this is the preferred embodiment.

Figure 3:
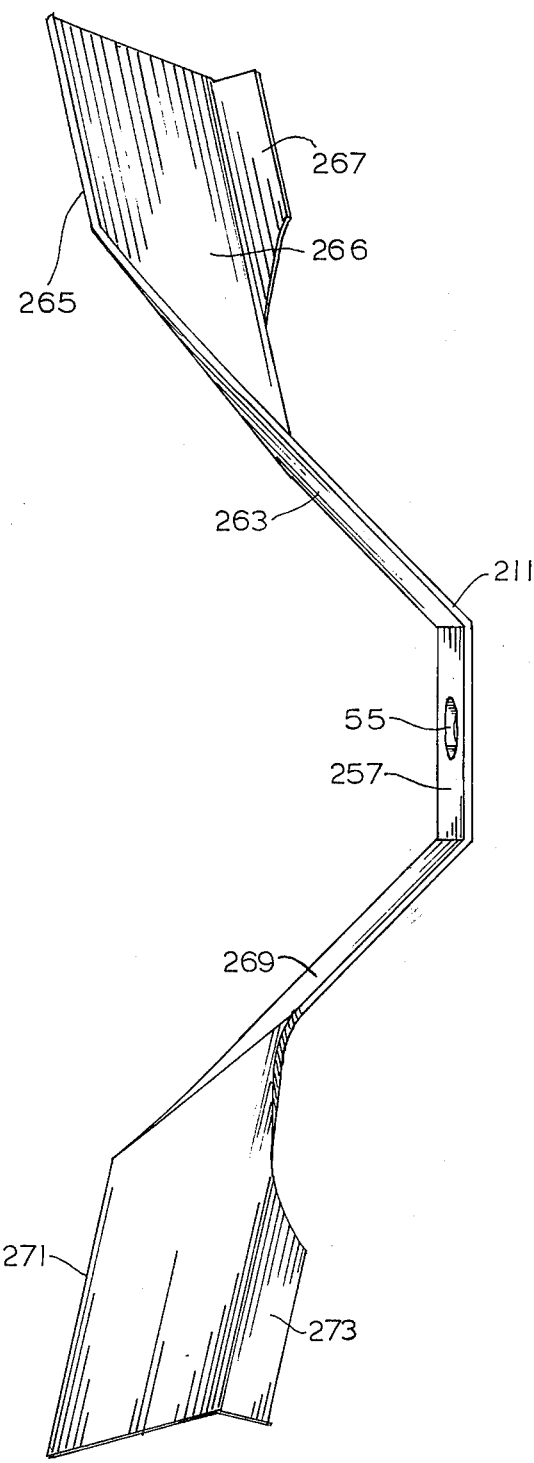
FIG. 3 is a side elevation of an alternative embodiment of the invention.

The alternative embodiment of the invention shown in FIG. 3 is designed for edgers that have the blade on the right side of the edger when facing the edger from the rear. (see FIG. 5). The embodiment of FIG. 3 is formed from steel 13 of FIG. 2 by bending each part of strip 13 in the direction opposite that described for forming blade 11. Thus, first tab 67 is bent downward about axis E by an angle of 90°; second tab 73 is bent downward about axis F by an angle of 90°; first hoe 65 is bent downward about axis D by an angle of 32°; second hoe 71 is bent downward about axis C by an angle of 32°; first portion 59 is bent upward about axis A by an angle of 90°; and second portion 61 is bent upward about axis B by an angle of 45°. This latter bending forms blade 211 shown in FIG. 3 and having hub 257, first arm 263, second arm 269, first hoe 265 having first hoe face 266, second hoe 271 having second hoe face (not shown), first tab 267, second tab 273, and shaft hole 55.

Figure 4:
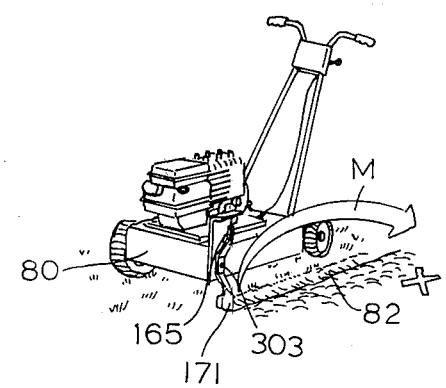
FIG. 4 is a pictorial view of the preferred embodiment of the invention during operation.
Figure 6:
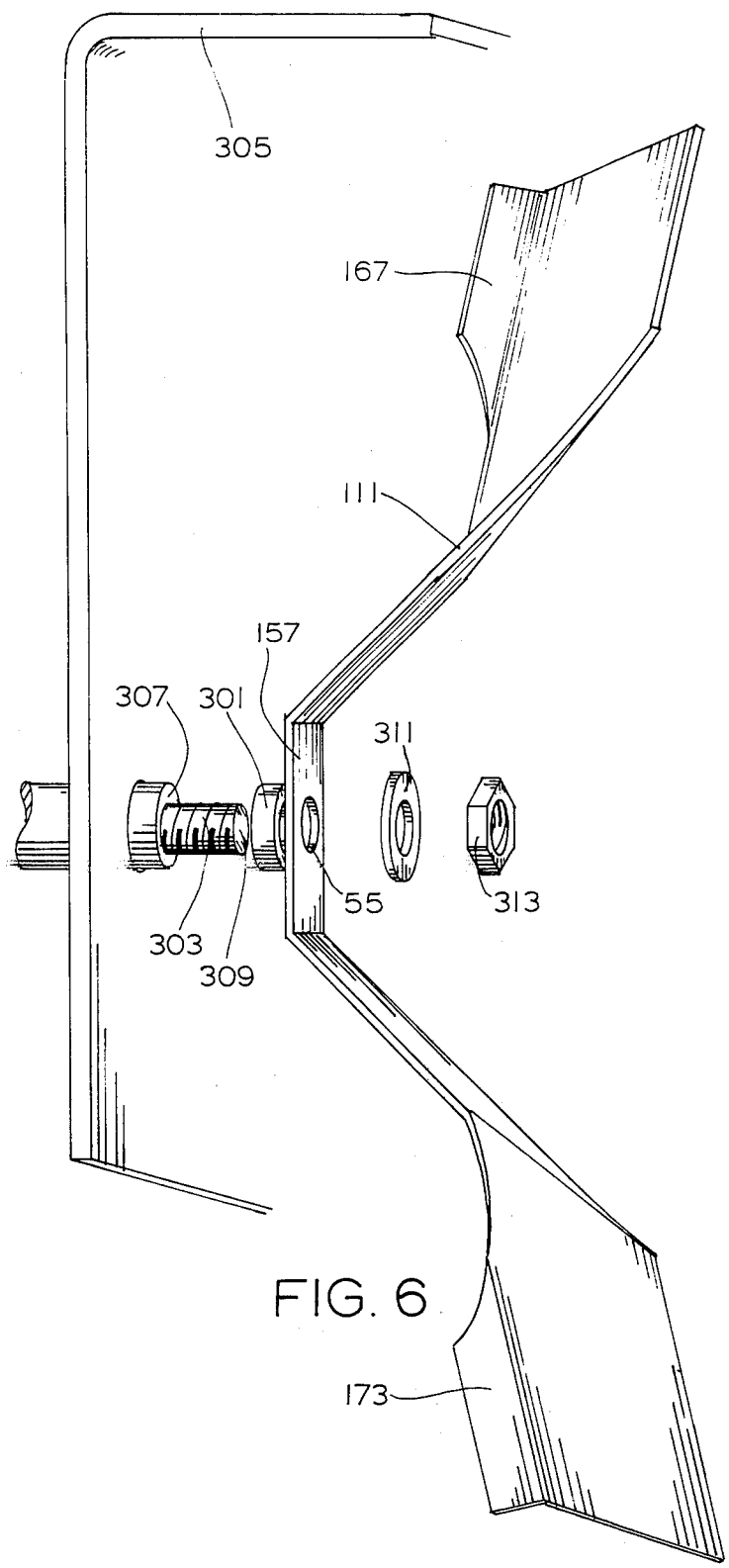
FIG. 6 is a side elevation illustrating a method of installing the preferred embodiment of the invention on an edger.

FIG. 6 illustrates the method of installing the preferred embodiment of the invention on a standard gasoline-powered edger 80 shown in FIG. 4. Annular spacer 301 is inserted over shaft 303 of edger 305 and against annular shoulder 307 of shaft 303. Blade 111 is then placed onto shaft 303 and against spacer 301 by means of shaft hole 55 such that first and second tabs 167 and 173 face inward (away from end 309 of shaft 303). Flat washer 311 is then placed onto shaft 303 and against hub 157 of blade 111. Blade 111 together with spacer 301 and washer 311, are secured in position by nut 313 which is threaded tightly onto shaft 303.

Figure 7:
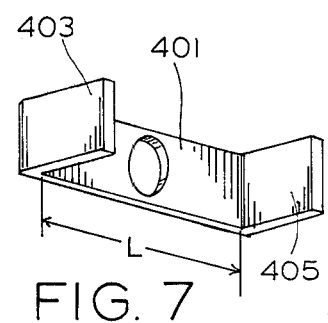
FIG. 7 is a pictorial view of a wrap-around washer used in securing the preferred embodiment of the invention in position on an edger.

Annular spacer 301, designed primarily to position blade 111 and washer 311 toward end 309 of shaft 303 so nut 313 can be tightened against washer 311 on the threaded portion of shaft 303, is optional. Wrap-around 401, shown in FIG. 7, may be used to reduce slippage of blade 111 on shaft 303. Wrap-around 401, having length L of 2½ inches, can be placed on shaft 303 between nut 313 and washer 311 such that end tabs 403 and 405 fit around the side edges of hub 157 of blade 111.

Figure 5:
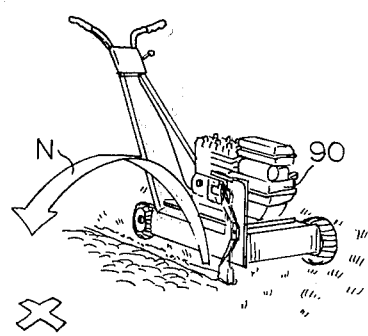
FIG. 5 is a pictorial view of an alternative embodiment of the invention during operation.

Blade 211 of FIG. 3 is installed in similar fashion on an edger 90 shown in FIG. 5.

Figure 8:
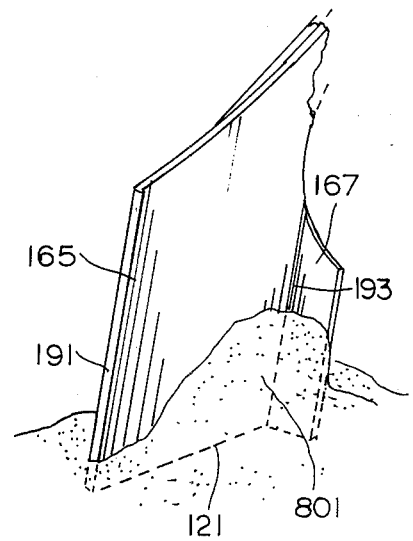
FIG. 8 is a pictorial view of a portion of the preferred embodiment of the invention illustrating the digging process.

Operation of the edger with the article of the present invention installed is similar to operation of the edger with a standard flat blade. As shown in FIG. 4, rotating shaft 303 of edger 80 is lowered until first and second hoes 165 and 171 dig into the ground to the desired depth. The actual digging process is shown in detail in FIG. 8 wherein lead edge 191 of first hoe 165 cuts into the surface of the ground thus breaking up the dirt. End edge 121 then scrapes the surface of the ground and dirt 801 is forced along the hoe face to the junction 193 of the hoe face and the tab portion and pulled along by first tab 167. As each hoe alternately scrapes the surface of the ground, a portion of dirt is lifted by the hoe and thrown in the direction indicated by arrow M. By pushing edger 80 forward, trough 82 is dug. The cutting action of the end edges and tabs of the blade is such that trough 82 is free of weeds and grass.

Operation of edger 90, shown in FIG. 5, is identical to that of edger 80 with the exception that the dirt is thrown in the direction of arrow N, substantially opposite the direction of arrow M.

The preferred embodiment of the present invention has been described in detail sufficient to enable one of ordinary skill in the art to make and perform the same. Modifications and alterations of the preferred embodiment in addition to those described herein and which do not depart from the spirit of the invention will occur to others upon a reading and understanding of the specification and it is our intention to include all such modifications and alterations as part of our invention insofar as they come within the scope of the claims.

I claim:

1. A hoe attachment to be rotated by the blade shaft of an edger, such blade shaft extending away from the main body of such edger, comprising:
   a unitary elongate blade including
   (a) a hub portion at the center of said blade, said hub portion having means for accomodating the shaft such that said blade is positioned to one side of the main body of such edger and such that as the blade shaft rotates about a horizontal axis, said hub portion rotates within a substantially vertical plane, (b) a hoe portion at either end of said blade, each said hoe portion including a leading edge rotationally in advance of the remainder of the corresponding end of said blade, an end edge at the extreme end of the corresponding end of said blade and forming an acute angle with said leading edge, a hoe face bounded in part by said leading edge and said end edge, and a substantially flat tab portion adjoining said hoe face rotationally at the rear of said hoe face, said hoe face facing to some extent into the direction of rotation such that when said blade is attached to an edger, the junction of said hoe face and said tab portion rotates within a path closer to the main body of such edger than does said leading edge and said tab portion rotates within a path closer to the main body of such edger than does the junction of said hoe face and said tab portion, and (c) an arm portion intermediate each said hoe portion and said hub portion, each said arm portion forming an angle with said hub portion to the extent that as the blade shaft rotates about a horizontal axis, all parts of both of said hoe portions are to one side of the plane within which said hub portion rotates.

2. The hoe attachment as recited in claim 1 wherein each said arm portion extends outwardly from said hub portion.

3. The hoe attachment as recited in claim 2 wherein the width of each said hoe face is substantially greater than the width of said hub portion.

4. The hoe attachment as recited in claim 1 wherein the plane of each said arm portion forms an angle of approximately 45° with said hub portion.

5. The hoe attachment as recited in claim 4 wherein the plane of each said hoe face forms an angle of approximately 32 degrees with the plane of the arm portion intermediate such hoe face and said hub portion.

6. The tool for hoeing comprising:
a shaft having a substantially horizontal axis;
means for rotating said shaft about its axis;
frame means for transporting said shaft and said rotating means over the ground in a direction substantially perpendicular to said axis of said shaft such that one end of said shaft is maintained a generally constant distance above the ground and to one side of said frame means; and
a blade attached to and rotated by said one end of said shaft, said blade having (a) a hub portion at the center of said blade, said hub portion having means for attaching said blade to said shaft such that as said shaft rotates about a horizontal axis, said hub portion rotates within a substantially vertical plane, and (b) a first hoe portion at one end of said blade and a second hoe portion at the other end of said blade, each said hoe portion having a leading edge rotationally in advance of the remainder of said hoe portion and disposed so as to cut into the surface of the ground along a substantially vertical plane as said blade is rotated by said shaft, and end edge at the extreme end of said hoe portion and intersecting said leading edge to form an angle, said end edge extending both rotationally behind said leading edge and toward said frame means so as to scrape the surface of the ground rotationally behind said leading edge as said blade is rotated by said shaft, and a tab portion rotationally at the rear of said hoe portion, said tab portion having an edge that rotates in a plane nearer the frame of the edger than does the remainder of said hoe portion; and (c) an arm portion intermediate said hub portion and each said hoe portion, each said arm portion extending outwardly from the frame of the edger.

7. The tool as recited in claim 6 wherein said hoe portion is substantially wider than said hub portion.

* * * * *